US011539265B2

United States Patent
Fella et al.

(10) Patent No.: US 11,539,265 B2
(45) Date of Patent: Dec. 27, 2022

(54) ELECTRIC MOTOR AND RADIATOR FAN

(71) Applicant: Brose Fahrzeugteile SE & Co. Kommanditgesellschaft, Würzburg, Würzburg (DE)

(72) Inventors: Maximilian Fella, Würzburg (DE); Eugen Hermann, Großheirath (DE); Sunny Zhang, Eindhoven (NL); Janik Schulz, Würzburg (DE)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 222 days.

(21) Appl. No.: 16/924,022

(22) Filed: Jul. 8, 2020

(65) Prior Publication Data

US 2021/0013771 A1    Jan. 14, 2021

(30) Foreign Application Priority Data

Jul. 8, 2019   (DE) ..................... 10 2019 210 028.7

(51) Int. Cl.
| | |
|---|---|
| *H02K 3/487* | (2006.01) |
| *H02K 5/24* | (2006.01) |
| *B60K 11/04* | (2006.01) |
| *F01P 3/18* | (2006.01) |
| *F01P 5/04* | (2006.01) |

(Continued)

(52) U.S. Cl.
CPC ............... *H02K 5/24* (2013.01); *B60K 11/04* (2013.01); *F01P 3/18* (2013.01); *F01P 5/04* (2013.01); *H02K 3/487* (2013.01); *H02K 3/522* (2013.01); *H02K 15/02* (2013.01); *F01P 2005/046* (2013.01)

(58) Field of Classification Search
CPC .......... H02K 3/487; H02K 3/522; H02K 5/24; H02K 7/14; H02K 2203/12
See application file for complete search history.

(56) References Cited

U.S. PATENT DOCUMENTS

| | | | | |
|---|---|---|---|---|
| 3,243,622 A | * | 3/1966 | Whittlesey | ............. H02K 3/487 |
| | | | | 310/214 |
| 5,252,877 A | * | 10/1993 | Sawa | ..................... H02K 3/493 |
| | | | | 310/214 |

(Continued)

FOREIGN PATENT DOCUMENTS

| | | |
|---|---|---|
| CH | 698526 B1 | 8/2009 |
| DE | 2010145841 A2 | 12/2010 |

(Continued)

*Primary Examiner* — Dang D Le
(74) *Attorney, Agent, or Firm* — Brooks Kushman, P.C.

(57) ABSTRACT

An electric motor including a rotor rotatably mounted about a rotational axis extending in the axial direction, and a stator including stator teeth widened in a T shape at the tooth-base side to form pole tabs and extending in the circumferential direction. The pole tabs may form a bearing shoulder. A respective stator slot for receiving coils of a stator winding is formed between adjacent stator teeth and a slot opening formed between mutually facing pole tabs. A reinforcing element may be inserted into a slot opening. The reinforcing element are held on mutually facing pole tabs of adjacent stator teeth by the bearing shoulders. The reinforcing element includes a contour that engages a bearing region to reduce a contact area with the bearing shoulders.

18 Claims, 7 Drawing Sheets

(51) Int. Cl.
    *H02K 3/52*         (2006.01)
    *H02K 15/02*      (2006.01)

(56) References Cited

U.S. PATENT DOCUMENTS

| | | | | |
|---|---|---|---|---|
| 5,258,681 | A * | 11/1993 | Hibino | H02K 3/493 |
| | | | | 310/214 |
| 6,713,927 | B2 * | 3/2004 | Kikuchi | H02K 3/24 |
| | | | | 310/214 |
| 7,986,070 | B2 * | 7/2011 | Baudelocque | H02K 5/1282 |
| | | | | 310/43 |
| 9,331,537 | B2 * | 5/2016 | Bang | H02K 3/34 |
| 10,291,106 | B2 * | 5/2019 | Takahashi | H02K 3/24 |
| 2015/0076954 | A1 | 3/2015 | Johnson et al. | |
| 2016/0285332 | A1 | 9/2016 | Huang et al. | |
| 2018/0115222 | A1 | 4/2018 | Lassila | |

FOREIGN PATENT DOCUMENTS

| | | |
|---|---|---|
| DE | 202012000842 U1 | 2/2012 |
| EP | 3512077 A1 | 7/2019 |
| GB | 2475604 A | 5/2011 |
| JP | 2009189145 A | 8/2009 |

* cited by examiner

ELECTRIC MOTOR AND RADIATOR FAN

CROSS-REFERENCE TO RELATED APPLICATIONS

This application claims the benefit of German patent application No. DE 10 2019 210 028.7 filed Jul. 8, 2019, the disclosure of which is hereby incorporated in its entirety by reference herein.

TECHNICAL FIELD

The present disclosure relates to an electric motor such as an electric motor to actuate a radiator fan for use in a motor vehicle.

BACKGROUND

A brushless electric motor may include a rotatably mounted rotor and a stationary stator. In this case, the stator has stator teeth, which are arranged radially, for example in a star shape, and between which a stator slot is formed in each case. A stator winding in the form of individual coils is received in these stator slots, which coils are wound in particular from one wire. The coils, which are mutually interconnected, for example in a star or delta connection, are acted upon by an alternating current for generating a rotating field. The rotor furthermore may include permanent magnets, for example, the magnetic field of which alternates with the rotating field of the stator which is generated by the coils, so that the rotor is driven in a rotating manner.

SUMMARY

The present disclosure may be based on solving one or more objectives, such as providing an electric motor with improved acoustic properties, or a radiator fan having such an electric motor.

According to an embodiment, the electric motor may include a rotor, which is mounted to be rotatable about a rotational axis extending in the axial direction, and a stator with a laminated core, which forms a stator yoke and stator teeth of the stator which are directed radially from the stator yoke, wherein the stator teeth are widened in a T shape at the tooth-base side (free-end side, pole shoe side) to form pole tabs (tooth tips) extending in the circumferential direction of the stator.

As an example, so-called stator slots for receiving coils of a stator winding may be formed between the stator teeth and a respective slot opening is formed between mutually facing pole tabs.

The pole tabs may each form a bearing shoulder. As an example, the bearing shoulders are formed by a bearing surface or by a bearing contour of the respective pole tab. A number of reinforcing elements may be provided, that may be inserted into a corresponding number of slot openings. In this case, the reinforcing elements are held on the mutually facing pole tabs of adjacent stator teeth in the radial direction by means of the bearing shoulders formed from these pole tabs.

In one or more embodiments, the or each of the reinforcing elements has, in the bearing region for the respective bearing shoulder, a contour which serves to reduce a contact area with this bearing shoulder. As an example, the contour serves to reduce a contact area with the laminated core of the corresponding pole tab.

In this case, a number of reinforcing elements is understood to mean one, two or more reinforcing elements. For example, a respective reinforcing element is inserted into each second slot opening in the circumferential direction. However, the number of reinforcing elements may correspond to the number of slot openings, so that one reinforcing element is inserted into each slot opening.

Widened in a T shape is understood to mean that the stator teeth have a T-shaped cross-section in a plane perpendicular to the axial direction. In this case, the stator teeth extending from the stator yoke along the radial direction form the vertical T limb (tooth shaft) of the T shape, whilst the pole tabs oriented in the circumferential direction, i.e. perpendicularly to the axial and to the radial direction, form the horizontal T limb (base) of the T shape. In this case, the horizontal T limb is arranged on the free-end side, i.e. on that side of the stator tooth which faces the rotor or the gap between this and the stator. As an example, in this case, the horizontal T limbs each form a pole shoe.

In addition to the stated form fit in the radial direction, the reinforcing elements, as a result of the bearing shoulder, are additionally joined to the corresponding pole tabs with force fit, such as by press-fitting and/or with material fit, for example, by adhesion.

Reinforcement of the stator may be realized by means of the reinforcing elements. In one or more embodiments, the reinforcing element(s) may exert a force on the stator teeth, such as in the circumferential direction, and thus on the stator as a whole, so that an oscillation of the stator is damped and/or a natural frequency of the natural oscillation of the stator is specifically shifted, such as increased, to a frequency range in which oscillation excitation is not to be expected. In summary, the acoustics of the electric motor are thus improved and wear due to oscillation is prevented from occurring.

A reinforcing element formed from a plastic is not sufficiently temperature resistant in terms of the temperatures which occur during operation of the electric motor, which means that the damping and/or the frequency shift do not take place or do not take place to a sufficient extent. As an example, a reinforcing element manufactured from plastic is furthermore not sufficiently rigid for such a frequency shift.

The reinforcing element is may be formed from a metal or from an alloy or contains a metal or an alloy. This increases the rigidity of the stator sufficiently so that the oscillation excitation is reduced or prevented.

In this case, as a result of the contour of the reinforcing element, which is arranged in the bearing region for the respective bearing shoulder, and the associated reduction in the contact area between the reinforcing element and the laminated core of the stator, the formation of eddy currents is prevented or at least reduced. As a result, the efficiency of the electric motor may be also improved, i.e. increased.

A corrosion-resistant material or a corresponding alloy may be selected for this purpose. For example, the reinforcing element may be formed from a non-magnetic and corrosion-resistant stainless steel such as X5CrNi18-10.

The reinforcing elements may be inserted into the corresponding slot openings after the insertion of the coils, which takes place, for example, by means of a so-called needle winding. It is thus furthermore enabled that the winding or the tool which carries out the winding moves through the slot openings. As an example, there is therefore no need to change the laminated core of the stator. The laminated core of the stator can therefore be manufactured using the previous methods and (punching) tools used for this purpose.

According to another embodiment, the laminated core may be formed form a number of individual laminations. As an example, each individual lamination may include an annular yoke portion and radially directed lamination teeth, formed in one piece, i.e. monolithically, with said yoke portion, which are widened in a T shape at the tooth-base side to form lamination tabs extending in the circumferential direction of the stator. The stator yoke is formed from the yoke portions of the individual laminations, the stator teeth are formed from the lamination teeth of the individual laminations and the pole tabs are formed from the lamination poles of the individual laminations.

In one or more embodiments, such a stator provided with a laminated core formed from one-piece individual laminations can be manufactured with comparatively little effort. For example, during the manufacture of stators in a so-called star yoke design, the yoke and the stator teeth are punched from the individual laminations as individual components and must then be joined together. In the case of a stator including a bundle of one-piece individual laminations, this step is omitted, thereby saving costs on both a method for manufacturing the stator and a tool required accordingly for this.

According to one or more embodiments, the pole tabs may include, on the free-end side, a slot which is open in the circumferential direction and extends in the axial direction, with two mutually opposing slot walls spaced from one another in the radial direction. One of the two slot walls forms the bearing shoulder for the reinforcing element in a radial direction, whilst the other slot wall then forms the bearing shoulder for the reinforcing element in the opposite radial direction.

The mutually parallel-oriented slot walls may extend in a plane defined by the circumferential direction at the point (in the radial position) of the slot and the axial direction. A slot base connecting the two slot walls extends accordingly in a plane defined by the axial direction and the radial direction. In other words, the slots are each set into the stator tooth in the circumferential direction.

According to a suitable further development, the stator, or only the laminated core, may include a plastic over molding by means of which one of the slot walls is formed. The stator-yoke-side slot wall may be formed by the plastic over molding and the rotor-side slot wall may be formed by the laminated core of the stator. For example, to form the slot, the laminated core of the stator may be L-shaped, notch at the circumferential ends of the pole tabs on their side facing the yoke so that the slot base and one of the slot walls, such as the rotor-side slot wall, is formed by the notch. In this case, the notch is cut out of or recessed in the plastic over molding to form the slot.

In one or more embodiments, the reinforcing element is designed as a plate or tile, i.e. as a plate-like or tile-like component. The reinforcing element may be rectangular. The planar sides of the plate are referred to below as broad sides. Two mutually spaced and expediently mutually parallel-oriented first narrow sides, which are referred to below as longitudinal sides, adjoin these broad sides. As an example, the longitudinal sides extend in the axial direction in the assembled state of the reinforcing element. The reinforcing element is therefore inserted into the slot opening in such a way that the longitudinal sides are arranged on the pole tabs. In this case, the broad side and, accordingly the longitudinal side (the first narrow side) have an extent (length) which corresponds to the extent of the slot opening in the axial direction.

Two mutually spaced and expediently mutually parallel-oriented second narrow sides adjoin the two broad sides and the two longitudinal sides, which second narrow sides are referred to as end-face narrow sides, transverse sides or end faces. In the assembled state of the reinforcing element, these extend from one of the pole tabs to the other pole tab which form the slot opening. In other words, end-face transverse sides are those narrow sides which are not formed to be joined to the pole tabs in the manner of a tongue and groove arrangement and which are oriented perpendicularly to the axial direction in the assembled state of the reinforcing element in the electric motor.

According to yet another embodiment, the contour for reducing the contact area with the bearing shoulders is formed by a cutout or by a recess in the narrow side facing the respective pole tab, i.e. the longitudinal side. A plurality of such cutouts or recesses may be provided. By way of example, the contour is alternatively formed by a depression or by integrally formed projections, wherein the depression or the projections are arranged on the respective longitudinal side and additionally or alternatively on the broad side, in the region of the respective longitudinal side.

If slots are formed in the respective pole tabs, the reinforcing element may be seated therein in the manner of a tongue and groove arrangement and is thus joined with form fit with respect to the radial direction. In this case, a respective joining projection complementary to the slot is arranged on the mutually opposing longitudinal sides (first narrow sides) of the plate-like reinforcing element. Alternatively, the plate-like reinforcing element has an extent (thickness) perpendicularly to the broad side which corresponds to the extent of the slot in the radial direction so that the free end of the reinforcing element is joined to the slot. If need be, a press-fit dimension is expediently permitted. As an example, in this case, the cutouts, depressions or notches are incorporated in the joining projection or in the free end to form the contour for reducing the contact between the reinforcing element and the laminated core of the stator.

The reinforcing element is designed, for example, in multiple parts in that a plurality of plate-like parts are provided. In this case, either their broad sides are facing one another or, alternatively, their transverse sides (second narrow sides) are facing one another. In the assembled state, the parts of the reinforcing element are arranged behind one another in the radial direction or above one another in the axial direction.

However, the reinforcing element may be formed as one piece and symmetrically. The reinforcing element may be designed to be symmetrically mirrored with respect to the longitudinal axis and to the transverse axis. In other words, the reinforcing element may be designed to be mirror-symmetrical with respect to two planes that may each extend through the perpendicular bisector of the broad side and parallel to the longitudinal side or parallel to the transverse side. As a result of the symmetry and the one-piece design, the assembly of the reinforcing element is possible in different orientations and in an identical and therefore particularly failsafe manner. Assembling the reinforcing element with the wrong orientation may be prevented. The reinforcing element can therefore be provided for assembly as bulk goods to save on costs.

Alternatively, the reinforcing elements are formed, for example, as a hybrid part. These therefore have a strut-like or lattice-like base body which is formed from metal or from an alloy and is overmolded with plastic. By means of the base body, the oscillation of the stator is damped and/or a natural frequency of the natural oscillation of the stator is specifically shifted to a frequency range in which oscillation excitation is not to be expected. Compared to the base body, the plastic has a higher electrical resistance so that the electrical resistance of the reinforcing element as a whole is diminished and eddy currents are further reduced.

In a suitable configuration, the reinforcing element is formed from a non-magnetic material. As an example, this refers to a magnetic permeability of the material of less than 5 ($\mu_r$<5), preferably equal to 1 ($\mu_r$=1), and an electrical conductivity (sigma) of less than 40 Siemens/meter ($\sigma$<40 S m$^{-1}$), preferably less than 1.4 Siemens/meter ($\sigma$=1.4 S m$^{-1}$).

Compared to the use of magnetic materials for the reinforcing element, magnetic termination does not take place in this way, and the useful output of the motor is therefore not reduced.

According to yet another embodiment, the or each of the reinforcing elements is provided with a coating to increase its electrical resistance. Eddy currents and eddy current losses are thus further reduced.

As an example, the reinforcing element has, on at least one of the (end-face) transverse sides, a joining contour for form fit with the respective pole tab with respect to the axial direction. Both end-face transverse sides preferably each have a joining contour.

By way of example, the joining contour is formed as a further bearing shoulder on a first of the end-face transverse sides so that the reinforcing element is secured against being released in the direction from the first transverse sides to the other, second transverse side, i.e. against being released in the axial direction. For example, the second transverse side additionally has a latching or snap hook which protrudes perpendicularly to this side and which latches with a corresponding contour, and the contour may be arranged or integrally formed to the plastic over molding of the stator.

The joining contour may be formed by a peg which, in the assembled state, grips the respective pole tabs axially from behind. For example, in an embodiment of the reinforcing element in the stainless steel variant, the pegs are aligned perpendicularly to the corresponding end-face narrow side. After the insertion of the reinforcing element into the slot opening, the pegs are bent to establish the axial grip from behind in the circumferential direction. In the plastic variant, the pegs of the reinforcing element are, for example, inclined away from one another at their ends in the circumferential direction. In the course of the assembly procedure, the pegs are resiliently bent (towards one another) so that, when fully inserted, they reach behind the corresponding pole tab of the stator tooth at least with an axially directed component.

The slot receiving the reinforcing element may not be continuous in the axial direction. In this case, the slot has a bearing portion for the reinforcing element at one of its end sides with respect to the axial direction. In the course of the assembly procedure, the reinforcing element is then inserted into the slot from the other end side. For example, in this case, the joining contour reaches behind the bearing portion so that the form fit is established comparatively reliably in the axial direction.

As a result of the form fit, the reinforcing element is therefore secured against release, which is particularly advantageous in terms of user safety during the operation of the electric motor and for preventing damage to the electric motor or other components which are arranged in the vicinity of the electric motor.

In an advantageous configuration, the reinforcing element is provided with at least one through-opening leading into the respective stator slot. As an example, the reinforcing element has a through-opening designed as a cutout or incorporated by means of a bore, which through-opening is continuous and extends perpendicularly to the broad side of the reinforcing element. The reinforcing element preferably has a plurality of such through-openings. The through-openings are, for example, circular or in the form of an elongated hole or a slot. On the one hand, by means of this through-opening, air circulation through the reinforcing element is enabled and cooling is therefore improved. Furthermore, dirt particles or water which may have entered into the electric motor can exit the stator slot more easily via these through-openings. On the other hand, the through-openings serve to reduce or prevent eddy current losses.

According to another embodiment, a radiator fan, for example for use in a motor vehicle, has an electric motor in one of the variants described above, which, such as, drives a fan impeller in a rotating manner. As an example, in this case, the inventive electric motor of the radiator fan has a number of reinforcing elements which corresponds to the stator slots, which reinforcing elements are held in the corresponding slot openings by means of bearing shoulders arranged on pole tabs of the stator teeth. In this case, the reinforcing elements each have a contour in the corresponding bearing region, which results in a contact area with the bearing shoulders being reduced. As an example, the pole tabs moreover have, at the free-end side, a slot which is open in the circumferential direction and extends in the axial direction and which has two mutually opposing slot walls which are spaced from one another in the radial direction, wherein one of the slot walls, for example, is formed by a plastic over molding of the stator. Acoustic properties of the radiator fan are particularly advantageously improved by means of the reinforcing element. In this regard, the acoustics in effect during the operation of the radiator fan are perceived as comparatively acceptable.

BRIEF DESCRIPTION OF THE DRAWINGS

Exemplary embodiments of the invention are explained in more detail below, with reference to a drawing, which shows.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Mutually corresponding parts are denoted by the same reference signs in all figures.

In this case, the rotor and the stator can each be formed as a laminated core, in particular to prevent eddy current losses. For example, WO 2010/145841 A2 discloses an electric motor with a stator, which can be constructed from a laminated core with individual laminations stacked on top of one another. This has a circumferential yoke and an even number of stator teeth, which protrude radially inwards. In this case, every second stator tooth in the circumferential direction is without a winding. The stator teeth supporting a winding furthermore have pole tabs at the inner tooth end, which protrude in the circumferential direction.

During operation of such an electric motor with a stator having a laminated core, a (natural) oscillation of the stator can be excited at certain rotational speeds. In other words, this refers to a resonance. This disadvantageously manifests itself as increased noise development, for example. Furthermore, as a result of these excited oscillations, an additional load and associated wear on the components which are in communication with the stator is increased.

Figure 1:
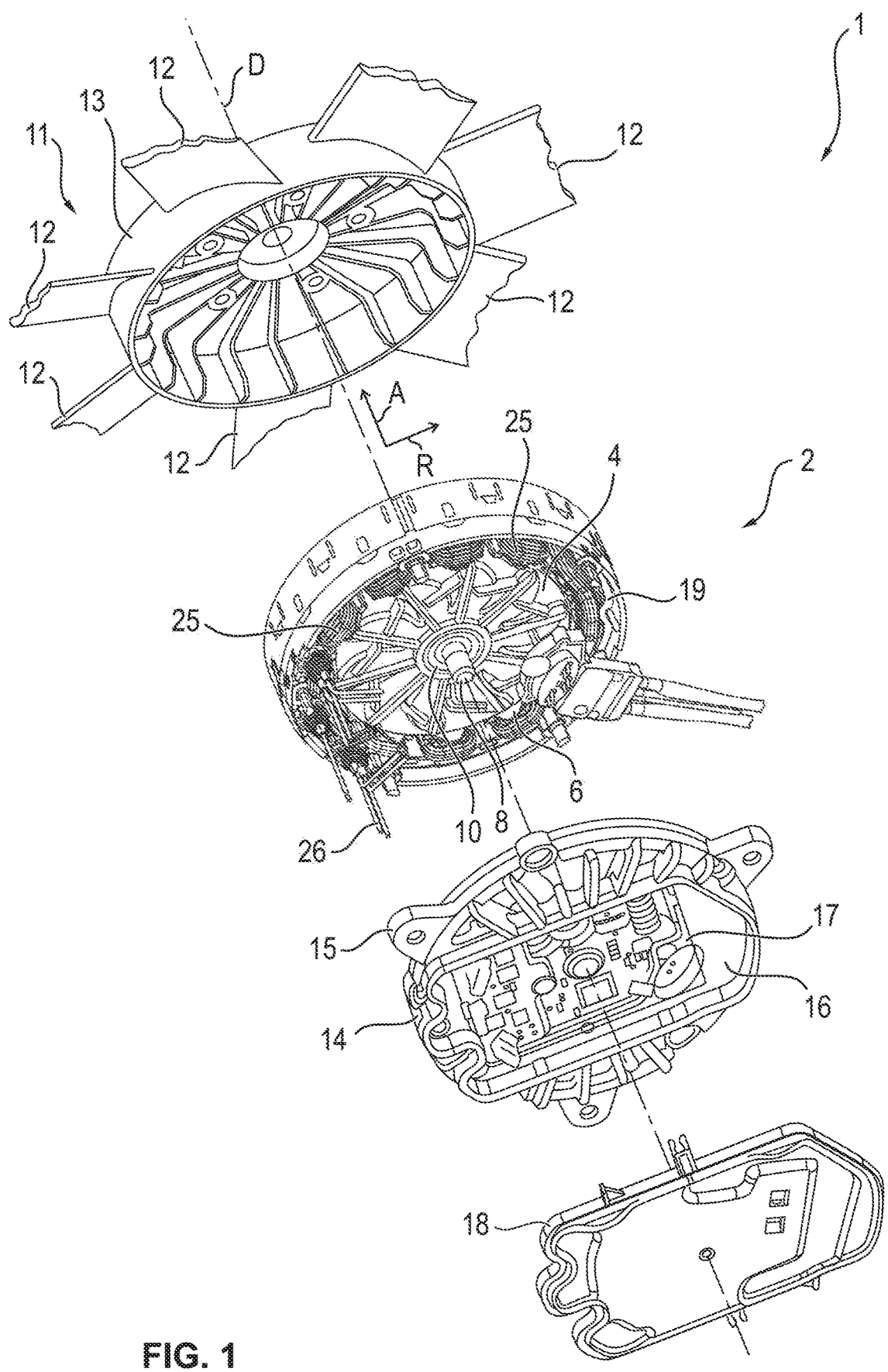
FIG. 1 in an exploded illustration, a radiator fan with an electric motor, which has a rotor designed as an inner rotor, and a stator whereof the stator teeth extend radially to the rotor, wherein the stator teeth are widened at the free-end side to form pole tabs, FIG. 2a and FIG. 2b in a plan view and in an enlarged detail in a perspective view, the laminated core of the stator, which is formed from a number of individual laminations, wherein the individual laminations each have a yoke portion from which stator teeth, monolithically formed on the yoke portion, extend radially, FIG. 3 in a perspective view, the stator with the laminated core and with a plastic over molding, wherein a respective reinforcing element for reinforcing the stator is inserted into slot openings formed between the pole tabs and held by bearing shoulders formed by the pole tabs, FIG. 4 on an enlarged scale, the region IV of FIG. 3, wherein the reinforcing element has a respective joining contour on its transverse sides, which joining contours are formed as pegs and grip the pole tabs axially from behind in the assembled state.

FIG. 1 shows, in an exploded illustration, a radiator fan 1, which may be configured for use in a motor vehicle (not illustrated further), with an electric motor 2, with a rotor 4 and with a stator 6. The rotor 4 is mounted to be rotatable about a rotational axis D by means of an axial pin 8, wherein the rotational axis D extends in an axial direction A. In this case, the axial pin 8 is mounted by means of bearings 10, which are arranged at the end face of the axial pin 8 in each case. In the drawing, the rotor 4 is designed as an inner rotor, i.e. the stator 6 surrounds the rotor 4 externally with respect to a radial direction R extending perpendicularly to the axial direction A. However, in a variant of the electric motor 2 which is not illustrated further, the rotor 4 is designed as an outer rotor. The explanations below apply analogously in this case.

The rotor 4 is in driving communication with a fan impeller 11. On its outer circumference, this latter has air guide vanes 12, which are only illustrated in part for better clarity. The fan impeller 11 has a central cap 13, which is secured to the rotor 4 of the electric motor 2.

A motor mount 14 with flanges 15 for securing the radiator fan is arranged on the end face of the electric motor 2 which is remote from the fan impeller 11. The motor mount 14 furthermore has, on its side remote from the fan impeller 11, an electronics compartment 16 for motor electronics 17, which is covered by an electronics compartment cover 18 in the assembled state.

The stator 6 has a substantially hollow-cylindrical stator yoke 19. From this, the stator teeth 20 thereof extend radially to the rotor 4. In this case, the stator teeth are widened at their free-end side, i.e. at the end facing the rotor 4, in a circumferential direction U with respect to the stator 6, in other words perpendicularly to the axial direction A and perpendicularly to the radial direction R, to form pole tabs 21. The stator teeth 20 therefore form a T shape in a plane perpendicular to the axial direction A, the horizontal T limb of which is formed by the pole tabs 21.

Figure 2A:
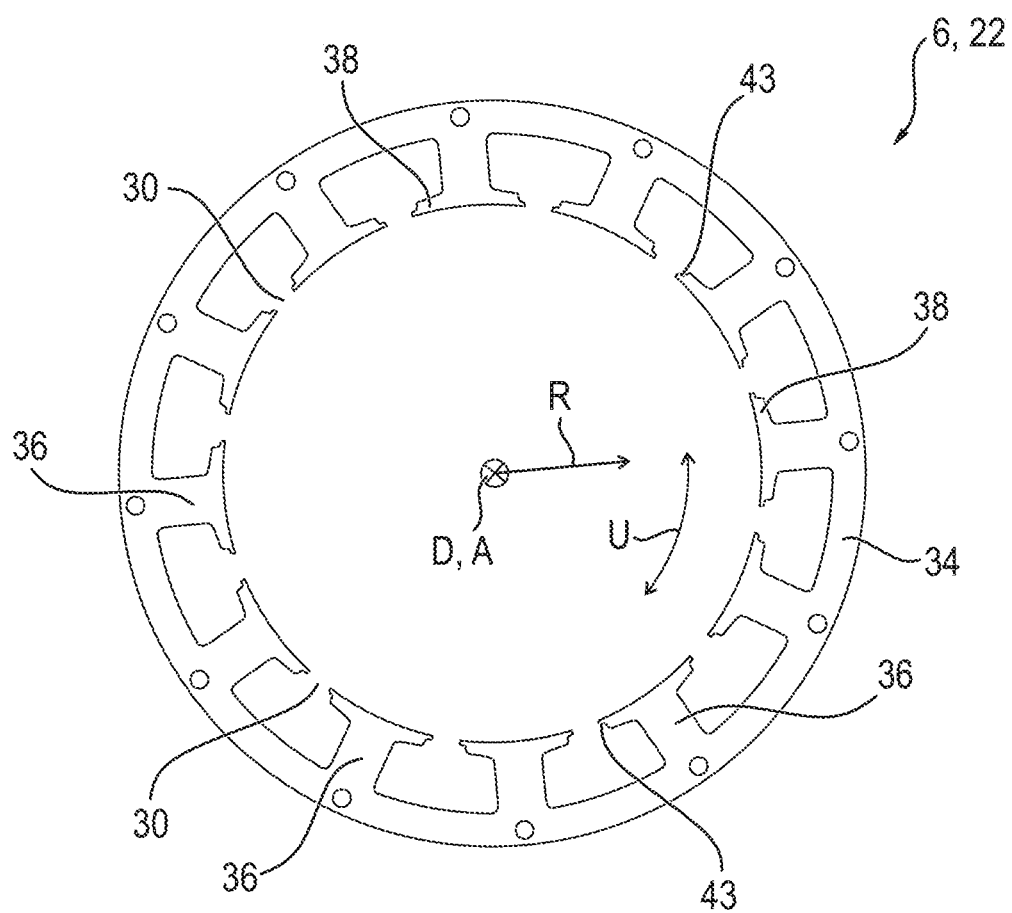
Figure 2B:
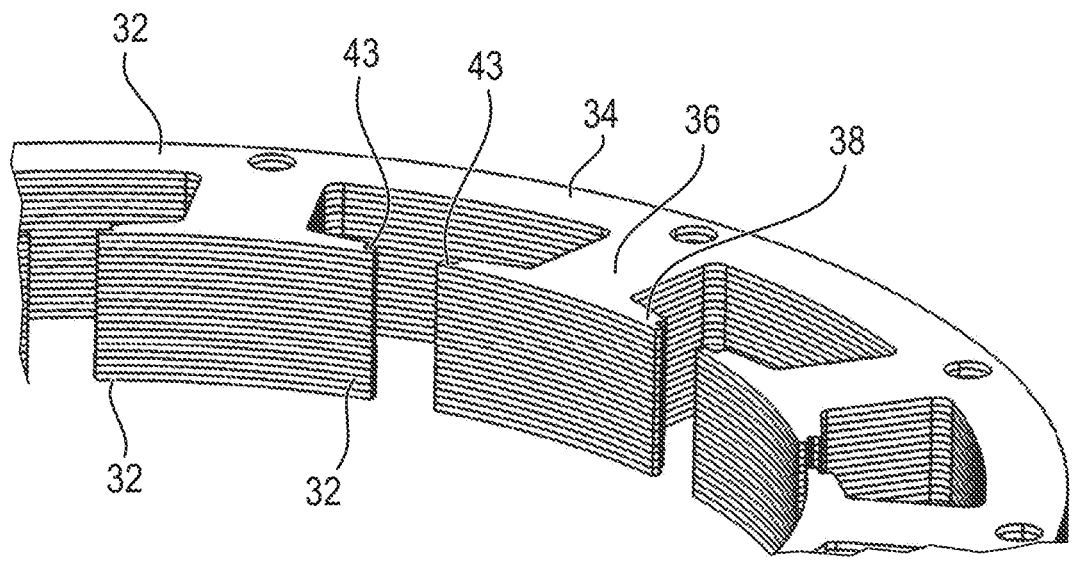

In this case, the stator 6 has a laminated core 22, which is illustrated in FIG. 2a and FIG. 2b, and a plastic over molding 23 (plastic sheath) comprising the laminated core 22. In this case, the stator teeth 20 are not provided with the plastic over molding 23 on the side facing the rotor 4. The widened stator teeth 20 are designed as pole shoes.

In this case, a respective stator slot 24, in which a coil 25 of a stator winding is received, is formed between adjacent stator teeth 20. In this case, the stator winding is energized accordingly by means of connections 26 for generating a rotating field. The slit-like opening, which is formed between the pole tabs 21 and, in the radial direction R, connects the corresponding stator slot 24 to an air gap formed between the rotor 4 and the stator 6, is referred to as slot opening 30 here. In other words, a respective slot opening 30 is formed between mutually facing pole tabs 21.

FIGS. 2a, b show the laminated core 22 of the stator 6. This is formed by a number of individual laminations 32. In this case, each of the individual laminations has an annular yoke portion 34 and lamination teeth 36 formed in one piece, i.e. monolithically, therewith, which extend radially from the yoke portion 34 to the center, in other words towards the inside of the yoke portion 34. On the tooth-base side (free-end side, inner side), the lamination teeth 36 are widened in the circumferential direction U of the stator 6 to form lamination tabs 38, so that the lamination teeth 36 are formed in a T shape. The individual laminations 32 are joined together to form the laminated core 22, wherein the stator yoke 19 is formed from the yoke portions 34 of the individual laminations 32, the stator teeth 20 are formed from the lamination teeth 36 and the pole tabs 21 are formed from the lamination tabs 38.

Figure 3:
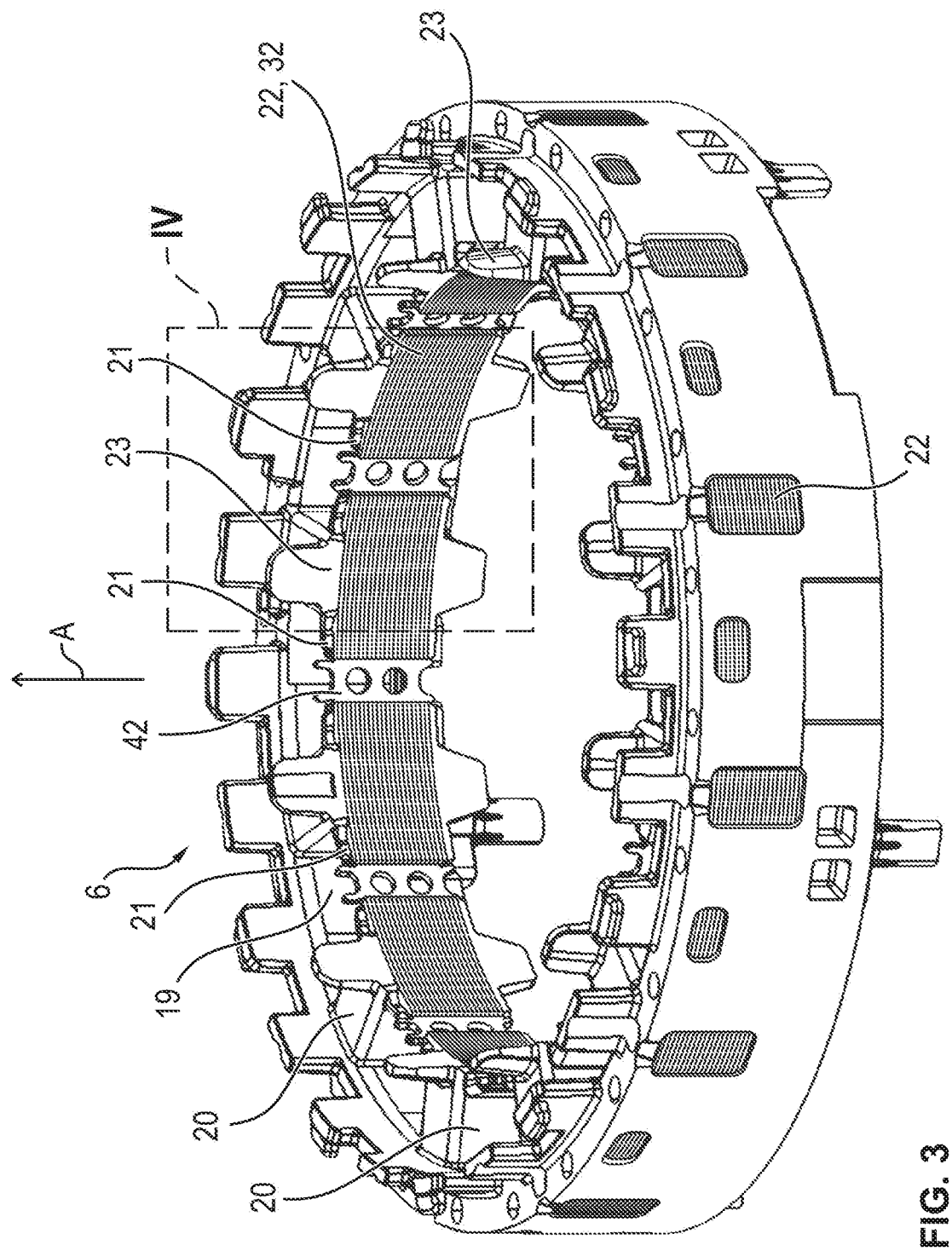

In FIG. 3, the stator 6 is illustrated with the laminated core 22 and the plastic over molding 23 surrounding the laminated core 22. In this case, a respective reinforcing element 42 is inserted into each of the slot openings 30. In this case, the pole tabs 21 each form a bearing shoulder 43 for the reinforcing elements 42. In other words, these are held on mutually facing pole tabs 21 of adjacent stator teeth 20 in the radial direction R by means of the bearing shoulders 43, wherein the bearing shoulders 43 are formed by the corresponding pole tabs 21. The acoustic properties of the stator 6 are altered as a result of the reinforcing elements 42. As an example, an oscillation excitation of the stator 6 is reduced, a possibly excited oscillation is damped to a comparatively great extent and/or a (natural) frequency of the oscillation of the stator 6 is shifted to a range in which oscillation excitation is not to be expected.

Figure 4:
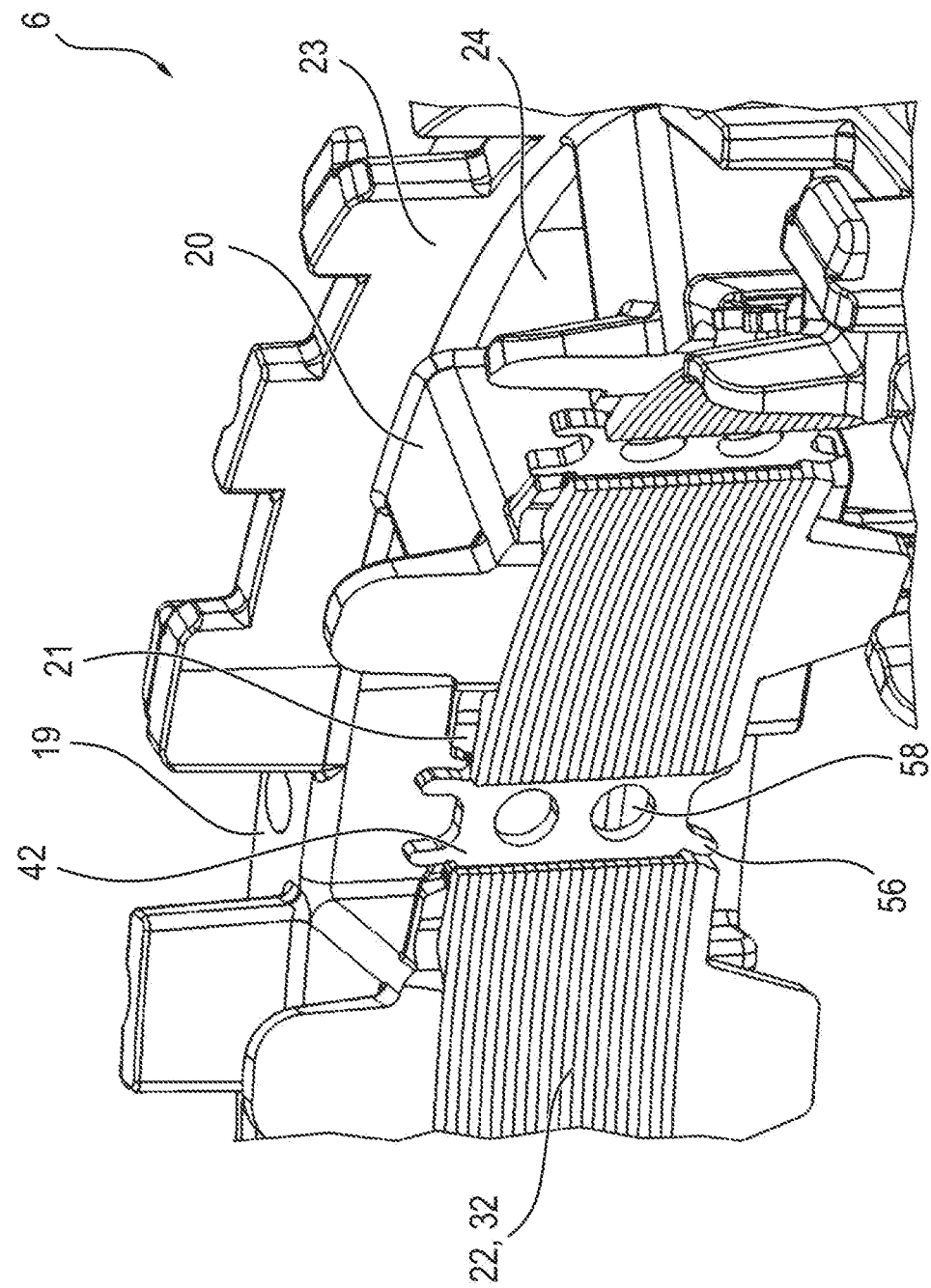
Figure 5:
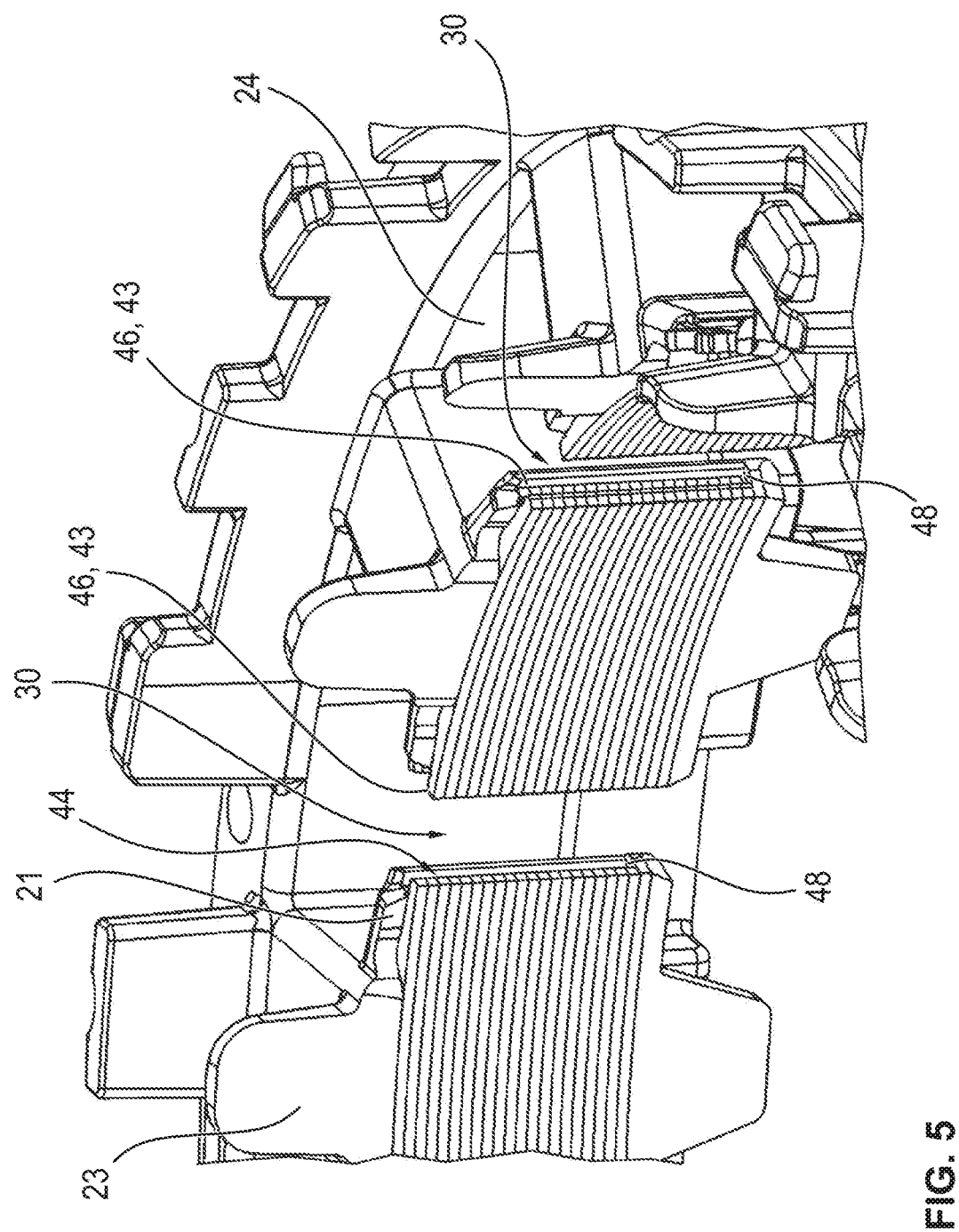
FIG. 5 the stator according to FIG. 4 with the reinforcing elements removed, wherein the stator has a circumferentially open slot in the region of the pole tabs for receiving the reinforcing element, FIG. 6a and FIG. 6b in a perspective view and in a plan view, the reinforcing element with through-openings incorporated in its broad side, with pegs extending perpendicularly outwards with respect to the transverse side and with longitudinal sides which adjoin these transverse sides and which have a contour for reducing a contact area with the bearing shoulders, and FIG. 7 a cross-section through the stator, with two further alternative configurations of the reinforcing element which are inserted into the corresponding slot openings, wherein the pole tabs of the stator teeth each serve as a bearing shoulder for the reinforcing elements.

FIGS. 4 and 5 show, in an enlarged detail according to FIG. 3, adjacent stator teeth 20 with the slot opening 30 formed between their pole tabs 21. In this case, the reinforcing element 42 is not illustrated further in FIG. 5 in order to more clearly illustrate the free end with respect to the circumferential direction U of the pole tabs 21. In the free-end-side region of the pole tabs 21, the stator 6 has a slot 44 which is open in the circumferential direction U and extends in the axial direction A. In this case, the slot walls 46 of the slot 44, which extend along the circumferential direction U, each form a bearing shoulder 43 for the reinforcing element 42. In the course of assembling the electric motor 2, the reinforcing elements 42 are each inserted into the corresponding slot 44 so that the reinforcing element 42 is consequently held in the slot opening 30 with form fit in the radial direction R by means of the bearing shoulders 43 formed by the slot walls 46.

To form the slot 44, the laminated stack 22 has, on the pole tabs 21, a notch on the free-end side with respect to the circumferential direction U, on the side facing the stator yoke 19. In this case, that side of the notch of the pole tabs 21 which is opposite the stator yoke 19 forms the slot wall 46 which is closer to the air gap and therefore the corresponding bearing shoulder 43. As illustrated comparatively clearly in FIG. 5, the plastic over molding 23 in this case forms the slot wall 46 which is closer to the stator yoke 19, whilst the slot wall 46 which is closer to the air gap formed between the stator 6 and the rotor 4 is formed by the laminated core of the corresponding stator tooth 20. In this case, the slots 44 are not continuous in the axial direction A. On one of its end sides, the slot has a further slot wall, referred to below as bearing portion 48, which extends in a plane perpendicular to the axial direction A. This establishes a form fit with the reinforcing element 42 to prevent the reinforcing element 42 from being released in the axial direction from the open end face of the slot 44 towards the bearing portion 48.

Figure 6B:
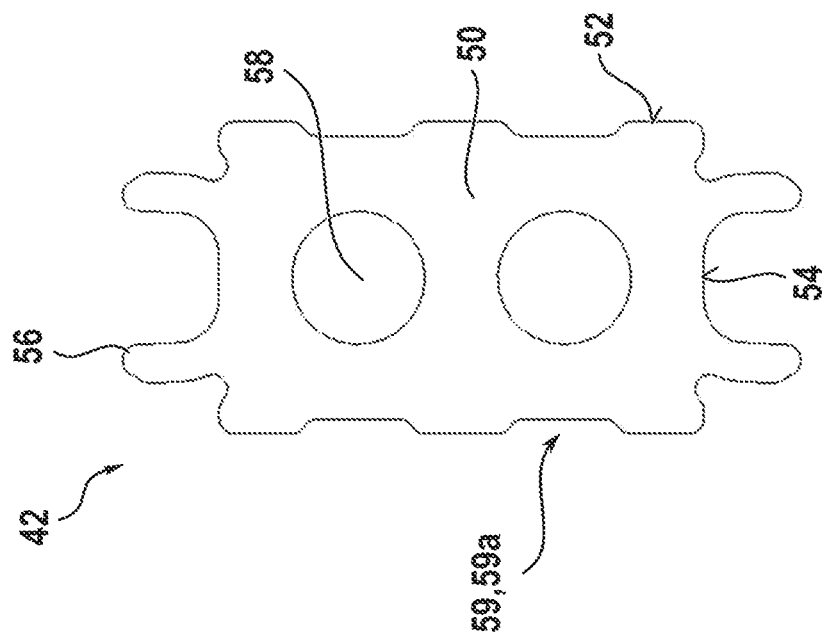
Figure 6A:
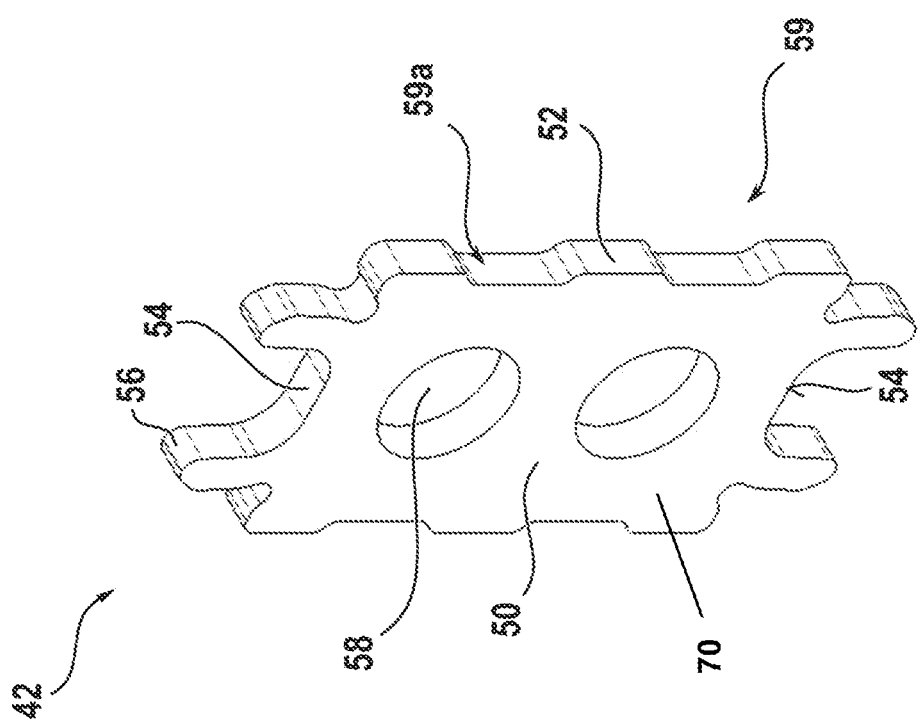

The planar sides (referred to as broad sides 50) of the reinforcing element 42 designed as a rectangular plate adjoin sides of the plate which are referred to as longitudinal sides 52 or as transverse sides 54. The reinforcing element 42 in FIGS. 6*a* and 6*b* is illustrated on an enlarged scale in a perspective view and in a plan view of the broad side 50. In this case, the reinforcing element 42 has an extent (thickness) perpendicularly to the broad side 50, which corresponds to the spacing between the slot walls 46. The wide side 50 and the longitudinal sides 52 also referred to as first narrow sides furthermore have an extent (length) which corresponds substantially to the extent of the slot 44 in the axial direction A. Both transverse sides 54, which are also referred to as end-face narrow sides, and which adjoin the longitudinal sides 52 and the broad sides 50, each have a joining contour 56 which is in turn designed as two pegs. The pegs reach behind the pole tabs 21 of the corresponding stator teeth 16 in the assembled state so that a form fit is established with respect to the axial direction A.

The reinforcing element 42 is made from a metal or from an alloy, for example from a non-magnetic stainless steel here. Prior to the initial assembly, the pegs protrude perpendicularly to the end-face narrow side 54. In the course of the assembly procedure, the pegs are bent to produce the form fit in the circumferential direction U.

The reinforcing element 42 here is designed in one piece and symmetrically. In this case, the reinforcing element 42 is mirror-symmetrical with respect to a plane which extends through the perpendicular bisector of the broad side 50 and parallel to the transverse side 54, and likewise mirror-symmetrical with respect to a plane which is formed by the perpendicular bisector of the broad side 50 and parallel to the longitudinal side 52.

The reinforcing element 42 furthermore has through-openings 58, which are designed as continuous bores incorporated in the broad side 50. In the assembled state, these lead into the corresponding stator slot 44. Eddy current losses are reduced by the through-bores 58. The through-bores 58 furthermore enable air circulation, such as for cooling.

The reinforcing elements 42 furthermore each have a contour 59 in the corresponding bearing region for reducing a contact area with the bearing shoulders 43 and therefore for reducing a contact area with the laminated core 22. In this case, the contour 59 is formed by two recess 59*a* in the respective longitudinal side 52. In other words, the recesses 59*a* are incorporated in the respective longitudinal sides 52 of the reinforcing element 42.

According to an alternative (not illustrated further) of the reinforcing element 42, this is additionally provided with a coating 70 which increases the electrical resistance of the reinforcing element 42.

Figure 7:
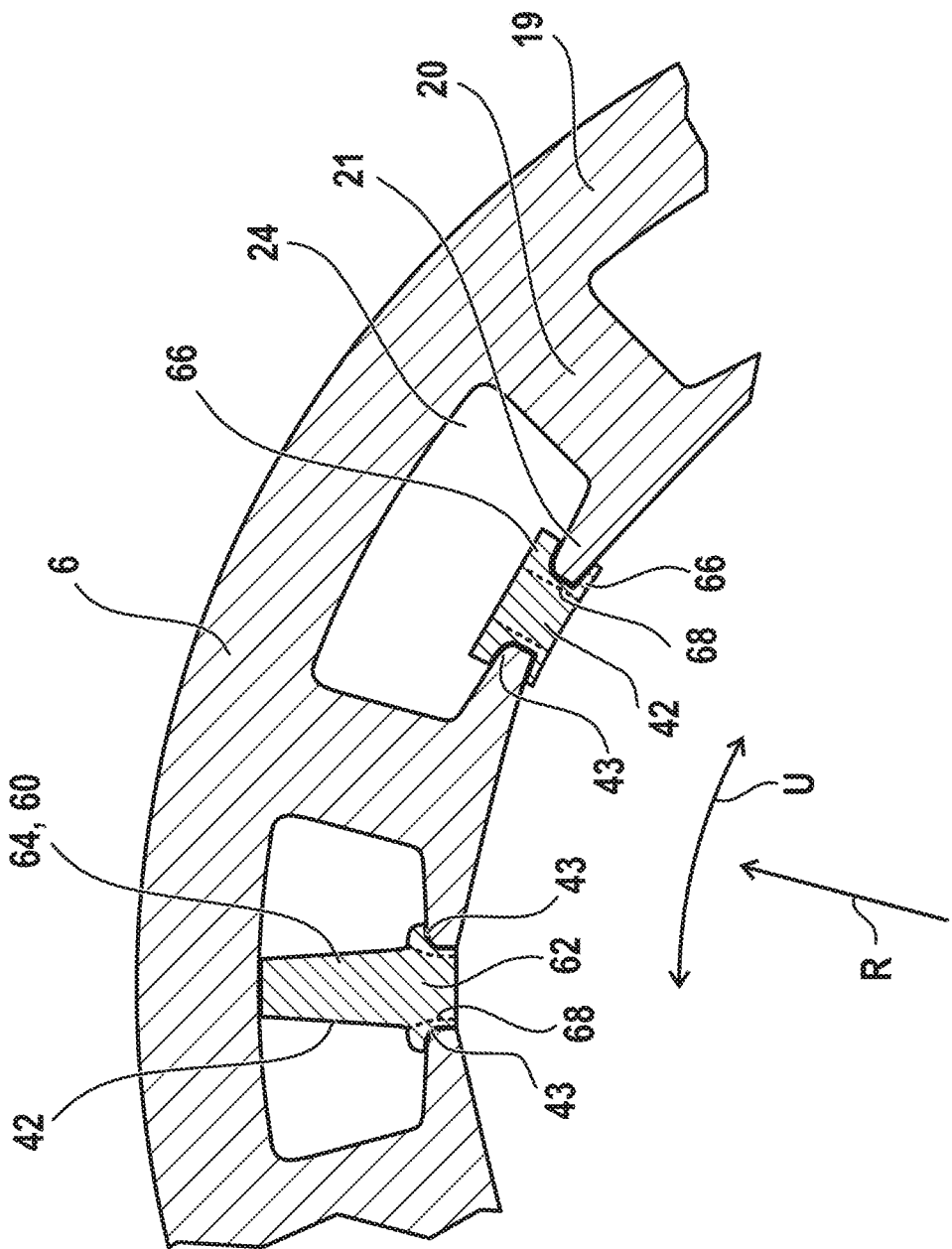

FIG. 7 shows a plan view of a cross-section through the stator 6, with a section plane which extends perpendicularly to the axial direction A. In this case, two further alternative configurations of the reinforcing elements 42 are illustrated, which are held in the radial direction by means of the bearing shoulders 43 formed by the pole tabs 32. In this case, the first of these two variants has a web 60, which extends in the radial direction R and abuts against the stator yoke 19. The reinforcing element 42 in this variant therefore has a T-shaped cross-section, whereof the horizontal T limb 62 abuts against the bearing shoulders 43 formed by the pole tabs 32 and the vertical T limb 64 is supported on the stator yoke 19. This reinforcing element 42 is pressed into the corresponding stator slot 24 and connected there with material fit, for example by (ultrasonic) welding.

The second alternative variant of the reinforcing element 42 of FIG. 7 has, in the section plane shown, a substantially H-shaped cross-section. The vertical H limbs 66 of the reinforcing element 42 of this variant surround the bearing shoulders 43, formed by the pole tabs 32, of adjacent stator teeth 20. In this case, the spacing between the vertical H limbs 66 is selected such that a press-fitting dimension is permitted. In other words, the reinforcing element 42 is held against the bearing shoulders 43 with force fit by press-fitting. In addition, this is joined to the bearing shoulders 43 with material fit by an adhesive or alternatively by (ultrasonic) welding. In this case, compared to the other vertical H limb 66, the vertical H limb 66 projecting into the air gap has a smaller extent in a direction along the horizontal H limb, i.e. in the radial direction R in the assembled state.

The dotted lines furthermore show the course of the surface 68 of the respective reinforcing element 42 in the region of the bearing shoulders 43 in a section plane which is parallel to, and spaced from, the section plane of FIG. 7. In this case, the reinforcing elements 42 do not abut against the pole tabs 21 or against the bearing shoulders 43 in this section plane. Therefore, in this plane, contact between the reinforcing element 42 and the laminated core 22 is prevented. As a result, contact (a contact area) with the laminated core 22 of the stator 6 is reduced, along with eddy currents which may be produced during operation of the electric motor 2.

The invention is not restricted to the exemplary embodiments described above. Rather, the person skilled in the art is also able to derive other variants of the invention from these without deviating from the subject matter of the invention. As an example, all individual features which are described in association with the exemplary embodiments can furthermore be combined with one another in a different manner without deviating from the subject matter of the invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

1 Radiator fan
2 Electric motor
4 Rotor
6 Stator
8 Axial pin
10 Bearing
11 Fan impeller
12 Air guide vane
13 Cap
14 Motor mount
15 Flange
16 Electronics compartment
17 Motor electronics
18 Electronics compartment cover
19 Stator yoke
20 Stator tooth
21 Pole tab
22 Laminated core
23 Plastic over molding
24 Stator slot
25 Coil
26 Connections
30 Slot opening
32 Individual lamination
34 Yoke portion
36 Lamination tooth
38 Lamination tab
42 Reinforcing element
43 Bearing shoulder
44 Slot
46 Slot wall
48 Bearing portion
50 Broad side or Wider side
52 Longitudinal side/first narrow side
54 Transverse side/second narrow side
56 Joining contour, peg
58 Through-openings
59 Contour
59a Recess
60 Web
62 Horizontal T-limb
64 Vertical T-limb
66 Vertical H-limb
68 Surface
70 Coating
D Rotational axis
R Radial direction
U Circumferential direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric motor comprising:
a rotor rotatably mounted about a rotational axis extending in an axial direction; and
a stator provided with a laminated core, forming a stator yoke, a number of stator teeth extending radially from the stator yoke, and a number of reinforcing elements,
wherein each of the stator teeth are T shaped and include a tooth-base side forming pole tabs extending in a circumferential direction defined by the stator,
wherein the stator defines a stator slot and a slot opening, wherein the stator slot is disposed between a first stator tooth and a second stator tooth, adjacent to the first stator tooth and configured to receive coils of a stator winding, wherein the slot opening is formed between a first pole tab and a second pole tab facing the first pole tab,
wherein the first pole tab forms a first bearing shoulder and the second pole tab forms a second bearing shoulder,
wherein a reinforcing element of the number of reinforcing elements includes a narrow side and a wider side, the wider side wider than the narrow side, the narrow side facing the first pole tab and defining a cutout forming a contour, and
wherein the reinforcing element is inserted into the slot opening and the contour engages the first bearing shoulder to hold the reinforcing element between the first pole tab and the second pole tab,
wherein the contour is configured to minimize a contact area between reinforcing element and the first bearing shoulder.

2. The electric motor of claim 1, wherein the reinforcing elements is coated with a coating configured to increase electrical resistance of the reinforcing element.

3. The electric motor of claim 1, wherein the laminated core is formed by a number of individual laminations each including an annular yoke portion and lamination teeth, wherein the lamination teeth are T-shaped and extend in a radial direction to form lamination tabs extending in the circumferential direction, wherein the stator yoke is formed by the yoke portions of each of the individual laminations, the stator teeth are formed by the lamination teeth, and the pole tabs are formed by the lamination tabs.

4. The electric motor of claim 1, wherein the first pole tab includes a number of slot walls defining a slot facing towards the circumferential direction and extending in the axial direction, and wherein the first bearing shoulder is formed by a wall of one of the slot walls.

5. The electric motor of claim 4, wherein the stator includes a plastic over molding that forms at least one of the slot walls.

6. The electric motor of claim 1, wherein the reinforcing element is rectangular.

7. The electric motor of claim 6, wherein the reinforcing element is formed by a non-magnetic material.

8. The electric motor of claim 7, wherein the reinforcing element is formed by X5CrNi18-10.

9. The electric motor of claim 1, wherein the reinforcing element includes at least one end-face narrow side defining a joining contour configured to engage the first pole tab to form a form fit connection between the first pole tab and the reinforcing element in the axial direction.

10. The electric motor of claim 9, wherein the reinforcing element includes a peg, wherein the peg forms the joining contour.

11. The electric motor of claim 1, wherein the reinforcing element defines at least one through-opening facing the stator slot.

12. A radiator fan for use in a motor vehicle, including the electric motor of one claim 1.

13. The electric motor of claim 1, wherein the reinforcing element defines a longitudinal axis and the reinforcing element is bilaterally symmetric with respect to the longitudinal axis.

14. An electric motor comprising:
 a rotor configured to rotate about a rotational axis and extending in an axial direction; and
 a stator circumferentially surrounding the rotor and including,
  a stator yoke,
  a first stator tooth and a second stator tooth each radially extending from the stator yoke, wherein a distal end of the first stator tooth forms a first pole tab and a distal end of the second stator tooth forms a second pole tab, adjacent to the first pole tab, wherein the first pole tab defines a bearing shoulder, and
  a reinforcing element including a narrow side and a wider side, the wider side wider than the narrow side, the narrow side facing the first pole tab and defining a cutout forming a contour that engages the first pole tab,
 wherein the contour is configured to minimize a contact area between reinforcing element and the bearing shoulder.

15. The electric motor of claim 14, wherein the first pole tab extends in a circumferential direction from the first stator tooth and the second pole tab extends from the second stator tooth in the circumferential direction towards the first pole tab.

16. The electric motor of claim 15, wherein the first pole tab includes first wall and a second wall, wherein the second wall defines a cutout and is disposed closer to the stator yoke than the first wall, and wherein the cutout forms the bearing shoulder.

17. The electric motor of claim 16, wherein the reinforcing element includes a distal end and a peg extending therefrom, wherein the peg forms the contour.

18. The electric motor of claim 16, wherein the stator yoke is formed by a plurality of stamped laminations.

* * * * *